United States Patent
Koch

(10) Patent No.: US 6,215,281 B1
(45) Date of Patent: Apr. 10, 2001

(54) METHOD AND APPARATUS FOR REDUCING BATTERY CHARGE TIME AND ENERGY CONSUMPTION, AS IN A NICKEL METAL HYDRIDE BATTERY PACK

(75) Inventor: Brian J. Koch, Berkley, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/526,361

(22) Filed: Mar. 16, 2000

(51) Int. Cl.[7] ........................................................ H02J 7/04
(52) U.S. Cl. ............................................. 320/150; 320/137
(58) Field of Search .................................... 320/150, 152, 320/117, 118, 119, 137, 160

(56) References Cited

U.S. PATENT DOCUMENTS

| | | | |
|---|---|---|---|
| 5,578,915 | * 11/1996 | Crouch, Jr. et al. | 320/118 |
| 5,739,670 | * 4/1998 | Brost et al. | 320/131 |
| 5,889,385 | * 3/1999 | Prodrazhansky et al. | 320/150 |
| 5,912,547 | * 6/1999 | Grabon | 320/150 |
| 6,011,380 | * 1/2000 | Paryani et al. | 320/150 |

* cited by examiner

Primary Examiner—Peter S. Wong
Assistant Examiner—Lawrence Luk
(74) Attorney, Agent, or Firm—Anthony Luke Simon

(57) ABSTRACT

The present invention in one form provides for an improved battery charging apparatus and method comprising a controller and battery balancing system including an algorithm which monitors temperature of the battery pack and state of charge. These are factored for a charge efficiency through comparison to a pre-determined table of charge efficiency values, and then compared against a threshold charge efficiency below which charging is considered not optimal. The charging operation is discontinued in the event charge efficiency is below the threshold value.

11 Claims, 2 Drawing Sheets

METHOD AND APPARATUS FOR REDUCING BATTERY CHARGE TIME AND ENERGY CONSUMPTION, AS IN A NICKEL METAL HYDRIDE BATTERY PACK

FIELD OF THE INVENTION

The present invention generally relates to battery charging, and more particularly to a battery charging method and apparatus for more efficiently charging a plurality of series connected electrochemical batteries in a pack.

BACKGROUND OF THE INVENTION

The present invention finds its origin in a nickel metal hydride battery pack for particular application as a motive power source in an electric vehicle, such as an automobile. As will be evident hereafter, however, it is not just limited to such an application or environment, but may have application to series strings of batteries as are used in back-up or uninterruptable power supplies, spacecraft and the like.

In the environment of a motive power source for an electric vehicle, the battery system is subject to widely varying discharge currents and discharge rates, sometimes severe operating temperatures, deep discharges and frequent recharge events. Battery packs used in such vehicles are generally series coupled cells.

The performance and cycle life of batteries in such a pack are strong functions of operating temperature. At high temperatures, both charging efficiency and available capacity of the cells are reduced. Internal battery side reactions that produce further heating (i.e, oxygen evolution and recombination), as in an overcharge condition during an equalization or balancing process (described in more detail hereinafter), tend to be favored over those that would tend to increase battery capability. This produces even more heat that must be dissipated. Accordingly, the vehicle thermal management system for the battery pack tends to operate over longer periods to cool the batteries. This can render the vehicle unavailable for use for extended times, while also increasing energy consumption through cooling imposed when ambient and pack conditions are not optimum, and indeed when there may be very little gain in useful energy storage. In the end, cells may also have to be replaced prematurely.

One known technique for detecting an inefficient charge event is to evaluate change in battery temperature with respect to time. A change in the slope of temperature change versus time (dT/dt) signals the onset of the side reaction mentioned above. Measuring battery temperature accurately can be difficult, however, particularly in vehicles using air as the cooling medium for the thermal management system. Temperature sensors, such as thermistors, located on the battery case are influenced not only by internal battery temperature, but also by air flow and ambient air temperature. Sudden changes in ambient conditions or in the operating state of the battery pack thermal management system, for example, can result in misleading temperature signals, which can trigger a premature termination of the charging event.

Variation in the amount of energy stored in each battery at any given time gradually develops as the result of battery-to-battery performance differences, which may result from internal impedances, impurities, density of electrolytic material, age, or ambient temperature gradients across the battery pack, to name some such influences. All batteries made to the same standard at the same time from the same materials are therefore by no means identical. Small differences in cell make-up and constituent elements become exacerbated over time. Since the batteries are arranged in a pack, some may be exposed to one ambient temperature on one side of the pack, with a different temperature on the other. Areas of the pack may dissipate heat differently depending on how the batteries of the pack are exposed, or for that matter confined. These temperature gradients affect the individual cell's performance.

The capability of the battery pack, and therefore the range of the vehicle, is in large measure then determined by the battery that contains the least amount of energy. That is, in discharging such a series connected pack, the amount of useful energy depends upon the weakest cell. Accordingly, a battery that falls to a significantly lower state of charge (SOC) than the others will cause a concomitant reduction in vehicle range. Failure to equalize can also result through what is termed cell reversal, which occurs when one battery is significantly different in energy content from others in the pack, as where one cell has become fully discharged while others remain at least partially charged. Further use of the pack can cause a reverse polarity voltage in the discharged cell, causing deterioration of that battery. The ability to balance the energy, or charge, in each of the batteries improves the life of the individual batteries as well as the useful capacity of the entire pack.

Equalization of the battery pack is a process by which more charge is returned to the batteries than was removed through vehicle use or self-discharge, for instance. In a procedure where charge is being returned to all of the batteries in a pack in common during equalization, batteries that are or soon become fully charged begin oxygen recombination in an overcharge condition, and produce heat, while batteries at a lower state of charge continue to increase in capability until they also begin oxygen recombination. At that point, SOC balance is considered to have been achieved among the batteries in the pack.

This equalization, or balancing, process is typically performed over a fixed time period following normal recharge. The current that is applied to the batteries is selected to give the most effective equalization in the time being allotted for the procedure. Typically, the current is a low one passed through the battery pack, in order to bring the undercharged batteries up while minimizing the evolution of gas through electrolysis in the overcharged cells. This is because a battery at about 90% of full charge shows reduced effectiveness of charge acceptance at a high charging rate. Operating at the low current for charge equalization extends the charging process in general.

The overcharge obviously requires additional charge time, and does not significantly increase the amount of useful energy stored in the battery pack. Disadvantages of this approach include an overly-extended duration of charge, as well as additional energy consumption by the vehicle's battery thermal management system as it is caused to remove the extra heat being generated by oxygen recombination of fully-charged batteries while others in the pack reach equalization level.

SUMMARY OF THE INVENTION

It is a principal objective of the present invention to reduce the charge time of a battery pack, as well as reduce energy consumption of the thermal management system. This objective has been achieved in one aspect of the invention as applied to vehicles, such as electric automotive propulsion systems, through the recognition that the charging process can be optimized through the combined use of measured temperature of the battery pack, the measured state of charge of the battery pack, and stored charge efficiency data. The combined use of the foregoing produces a robust system that is much less likely to lead to an undesired charge termination, and therefore yields a vehicle range that is optimized. While the temperature measurement is still subject to the effects of ambient conditions, noise and the like described above, the application of a charge efficiency criterion including calculated SOC eliminates temperature as the sole factor in determining whether charging is effective.

The present invention improves energy consumption efficiency, in part through charging events that are kept as short as possible. Conditions are detected during battery charging which may lead to excessive heating and energy consumption, and if the charge efficiency of the battery pack reaches a sufficiently predetermined low level, charging is deemed unproductive and is terminated until conditions improve. This has the attendant benefit of reducing operating costs and inconvenience to the operator of the vehicle. Battery life is further improved by general lower temperature charging cycles through better-managed equalization processes.

Using charge efficiency to monitor and control charging events provides a more reliable indication of charge completion. Charge efficiency is a function of both temperature and SOC, the latter not being prone to fluctuation through external conditions. Charge efficiency is first determined empirically for a given type of battery pack, and the charge efficiency data is stored in a battery pack control module (BPM) for use in a charging algorithm. Real-time pack temperature data and SOC calculations are then monitored and compared to the stored charge efficiency look-up table. The effect of the SOC stability is to essentially filter out any noise contributed with the temperature signal, thereby avoiding false or premature charge completions.

Since periodic overcharge of batteries in the pack is required for equalization, there are situations when the charge efficiency criterion should be ignored, but only when conditions are such that excessive heating of the pack and long charge times can still be avoided. The present invention thus further provides for a cooling effectiveness test to determine the performance of the vehicle thermal system and whether charge efficiency is to be disregarded, and overcharge be performed under the existing conditions.

Major advantages are considered to be reductions in charge times and attendant energy consumption, as well as increased longevity of the batteries through reductions in operating temperatures, as during the equalization process.

The present invention in one form provides for an improved battery charging apparatus and method comprising a controller and battery balancing system including an algorithm which monitors temperature of the battery pack and state of charge. These are factored for a charge efficiency through comparison to a pre-determined table of charge efficiency values, and then compared against a threshold charge efficiency below which charging is considered not optimal. The charging operation is discontinued in the event charge efficiency is below the threshold value.

In one form of the invention as applied to a rechargeable electrochemical battery system having a series arrangement of multiple batteries in a pack, and a pack cooling system having a cooling mode, a method of optimizing the charging of the battery pack comprises establishing one or more pre-selected charge efficiency values as a function of battery pack temperature and state of charge (SOC), including a threshold value CE below which charging is considered to be not optimal. A pre-selected temperature criterion ($T_{hi}$) above which cooling by the pack cooling system is considered reduced in effectiveness is likewise established.

In the first instance, a full charging event is performed if the temperature is below $T_{hi}$ or if the thermal system is not in a cooling mode. If the temperature is above $T_{hi}$, the SOC of the battery pack is determined. These are used to establish the then-existing charge efficiency ($CE_t$), which is compared against the threshold value CE.

Any charge cycle underway is completed if $CE_t$ is below the threshold value CE, with the system then proceeding to a support mode without equalization to reduce energy consumption and heat generation, since charging conditions are below optimal. If $CE_t$ is above the threshold value CE, charging is continued, including equalization, with periodic repetition of the preceding steps until full charging is completed, or until $CE_t$ falls below the threshold value CE, in which event charging is terminated and the support mode is entered.

Additionally, and to make the system even more robust, a criterion $SOC_{CE}$ can be selected establishing an SOC threshold below which CE is not considered as a completion factor. $SOC_{CE}$ is selected at a point where the side reactions driving a decline in charge efficiency are not a significant factor.

An apparatus for improved battery charging in a rechargeable electrochemical battery system is likewise provided, and in one form comprises a battery pack controller having comparator circuitry. The controller is programmed with the pre-selected charge efficiency data values including a threshold value CE below which charging is considered to be not optimal, along with the pre-selected pack temperature criterion $T_{hi}$ above which pack cooling by the pack cooling system is considered reduced in effectiveness.

A temperature sensor communicates with a temperature sensing point, as at the cooling fluid medium inlet, and generates a temperature signal. A current sensor measures pack current, which is used to calculate state of charge by the method of amp-hour integration, and generating a charge signal. Signal circuitry communicates the temperature signals and the charge signal to the controller. Charge circuitry connects a source of current to each battery.

As noted above, the controller has a charging program for optimum charging, which measures overall pack temperature and takes into account SOC for evaluation against the charge efficiency of that particular battery pack. Charging proceeds if the measured cooling medium temperature is below $T_{hi}$ or if the thermal system is not in a cooling mode. If the cooling medium temperature is above $T_{hi}$, the then-existing charge efficiency ($CE_t$) of the battery pack is determined, and compared against the threshold value CE. If $CE_t$ is below the threshold value CE, and SOC is below a threshold value $SOC_{CE}$, the system proceeds to a support mode. If $CE_t$ is above the threshold value CE, and SOC is greater than $SOC_{CE}$, the program continues any charge cycle with periodic repetition of the comparison steps until full charging is completed or until $CE_t$ falls below the threshold value CE, in which event charging underway is completed and the support mode is entered.

The invention, along with its advantages, will be further understood upon consideration of the following detailed description of an embodiment taken in conjunction with the drawings, in which:

DETAILED DESCRIPTION OF AN EMBODIMENT OF THE INVENTION

Figure 1:
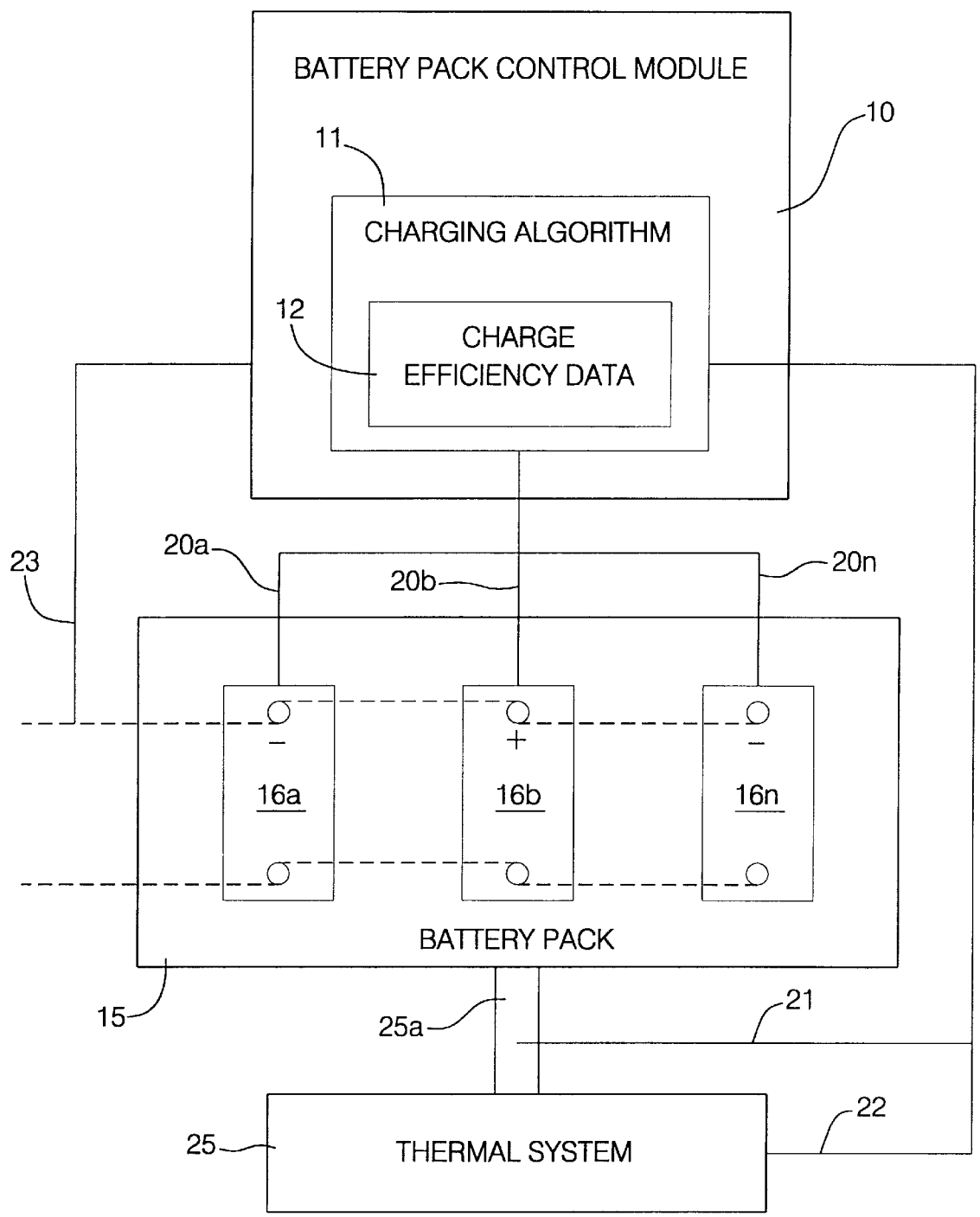
FIG. 1 is a schematic block-type diagram of the general components of a system in accordance with the present invention.

Referring now to FIG. 1 in the first instance, a block-type diagram of a presently preferred embodiment of the invention is shown. This is a computer-based system for dynamically determining opportune periods for battery equalization, otherwise referred to as balancing. At the core of the system is a battery pack control module (BPM) 10 having a charging algorithm 11 which includes the equalization logic 12 that will hereinafter be described. The BPM is relatively standard, having the usual CPU, clock, ROM, RAM, discrete I/O ports, A/D conversion circuitry, serial communication and data links for external device communication, control and data transfer, and the like well known in the art.

Battery pack 15 is a standard series-type arrangement of individual modules 16, or otherwise referred to herein as batteries or cells. In one application of the present invention, these are a plurality of nickel hydride cells 16a, 16b...16n for use as a propulsion power source for an automotive vehicle. Other vehicle accessories may be powered by another battery system.

Temperature readings for each of the batteries are obtained from respective temperature sensor, such as suitable thermistors or thermocouples, which are represented in the drawing as lines 20a, 20b and 20n. State of charge (SOC) is also determined for each of the batteries 16a–n through standard amp-hour integration of the current signal, here indicated by line 23. Suitable circuitry transmits signals of temperature 20a, 20b and 20n and SOC current 23 to the BPM.

The battery pack 15 has a standard thermal system for managing the temperature of the battery pack 15, such as in dissipating or rejecting heat during battery charging events. The thermal system 25 may be liquid cooled or air cooled, for instance. The fluid medium used has at least one inlet point to the thermal system, indicated here as 25a. Another temperature sensor indicated by line 21 monitors the fluid medium temperature, providing signals via appropriate circuitry to the BPM. A signal indicative of whether the thermal system 25 is or is not operating is also provided via line 22.

Charge efficiency data is stored in the BPM in a look-up table. Charge efficiency is calculated through experimentation, i.e., empirically, for each type of battery pack. Charge efficiency is the ratio of charge current which produces actual energy stored to total charge current input applied.

Figure 2:
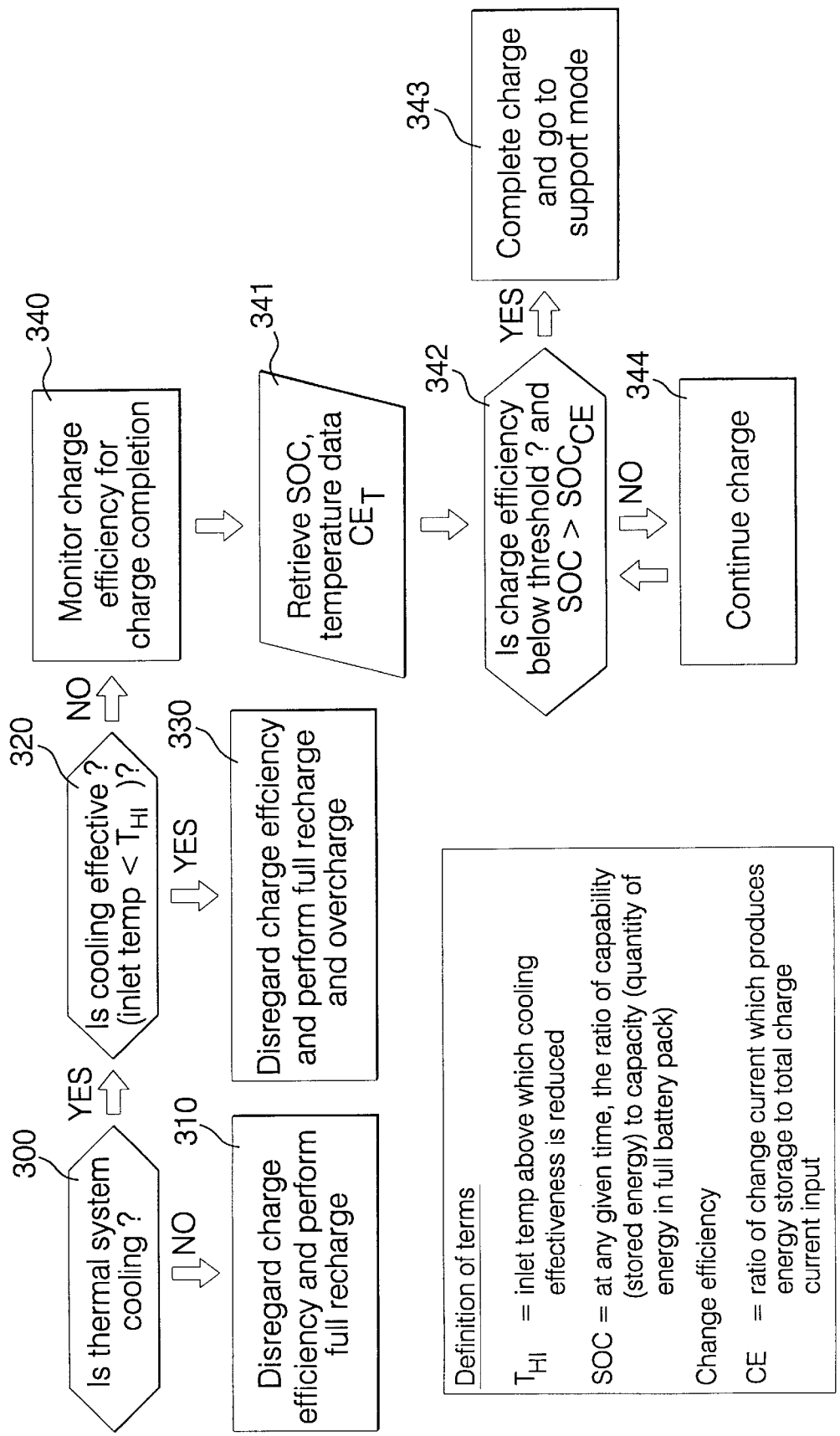
FIG. 2 is a flow diagram of program logic for carrying out an opportune charging method in accordance with the present invention.

Referring now to FIG. 2 in particular, a representative process flowchart is shown for a logic sequence executed by the BPM 10 to perform the opportune charging of the present invention. FIG. 2 is essentially an executive or main loop program which would include subroutines for performing various tasks. These subroutines will not be described in any detail herein, being generally standard and well understood on their own.

At block 300, the BPM reads the input signal 22 to initially determine whether the thermal system 25 is operating in a cooling cycle or not. If it is not, then the charge efficiency criterion (CE) is disregarded, and a full recharge event is engaged, as indicated by block 310. If thermal system 25 is in operation, then a reading is made of the temperature of the thermal system medium temperature (signal 21) indicated at block 320. That fluid medium temperature, which is equated as a general or overall battery pack cooling efficiency, is compared against a predetermined value whereat cooling effectiveness is considered to be reduced ($T_{hi}$) if the temperature is above $T_{hi}$, as further indicated at block 320. $T_{hi}$ is a value programmed into comparator circuitry of the BPM.

As illustrated in block 330, if the thermal system inlet temperature signal 21 is below $T_{hi}$, then the charge efficiency criterion is once again ignored, and a full recharge event proceeds. If the condition of block 320 is not met, i.e., the inlet fluid medium temperature is greater than $T_{hi}$, then the program proceeds to monitor charge efficiency for charge completion as follows, as initially noted at block 340.

First, SOC and pack temperature data are determined for the existing state of the battery pack, as referenced in block 341. The logic of the BPM determines an overall SOC. SOC in general is a function of the full capacity of the battery at 100% state of charge (Qf) and the cumulative capacity removed from the pack (Qd) in accordance with the following formula:

$$SOC=(Qf-Qd)/Qf$$

which yields the state of charge as the ratio of charge not removed to a full charge.

Pack temperature and SOC are then used to determine the then-existing charge efficiency of the battery pack $CE_t$, as indicated by block 342. That $CE_t$ is then compared against a predetermined threshold value CE in the charge efficiency data 12. If it is below the CE threshold, the charging sequence underway is completed and the system proceeds to a support mode, illustrated in block 343, until ambient conditions may improve to a more optimum level at a later time. The support mode cools the batteries to a predetermined set point. After the support mode, the vehicle "goes to sleep."

If $CE_t$ is above the threshold at the point of block 342, then charging continues as indicated in block 344, with the monitoring cycle repeating at pre-set intervals through blocks 341 and 342, until full charging is completed. In the event that heating of the battery pack causes $CE_t$ to fall below the CE threshold, then the support mode of block 343 would ensue.

In one application of the invention, the thermal system used was an air-cooled system, i.e., ambient air was used as the cooling medium in a non-recirculating arrangement. The battery type in point was a nickel metal hydride deep cycle having approximately a 90–100 amp-hr capacity, 200 W/kg, and a 65 W-hr/kg specific energy.

Temperature $T_{hi}$ was taken at the air inlet, to thereby take into account the effect of ambient air temperature, and establish the cooling effectiveness of the airstream (cooling medium) that was being applied to the battery pack. The higher the temperature of the cooling medium, the less effective the heat transfer from the battery pack.

The particular $T_{hi}$ chosen was 12° C. It was arrived at empirically, essentially being established from the amount of time it took the battery pack to cool in general over the span of a typical nighttime non-use cycle. $T_{hi}$ is thus a function of the type of battery pack in point.

It should be additionally noted that in a recirculating cooling medium (such as a liquid coolant) where the temperature of the coolant being output to the battery pack can be more controlled, $T_{hi}$ can essentially drop out of the equation, as being essentially met by the closed loop system presumably operating at less than $T_{hi}$.

The threshold value CE was established in the foregoing embodiment at about 75%. The value for $SOC_{CE}$ was set at about 80%, which was chosen as the approximate point where side reactions in this type of battery begin to occur at a level causing an appreciable decline in the efficiency of charging. Below 80% for SOC, charge efficiency was not considered to matter.

While the invention has been discussed with respect to a presently preferred embodiment, those of skill in the art will recognize various modifications, variations and alternatives that still will fall within the intended scope of the invention.

What is claimed is:

1. In a rechargeable electrochemical battery system having a series arrangement of multiple batteries in a pack, and a pack cooling system having a cooling mode, a method of optimizing the charging of the battery pack, comprising the steps of:

establishing pre-selected charge efficiency values as a function of battery pack temperature and state of charge (SOC), including a threshold value CE below which charging is considered to be not optimal;

establishing a pre-selected pack temperature criterion ($T_{hi}$) above which pack cooling by the pack cooling system is considered reduced in effectiveness;

measuring overall pack temperature;

performing a full charging event if the measured pack temperature is below $T_{hi}$ or if the thermal system is not in a cooling mode;

if the pack temperature is above $T_{hi}$, measuring SOC of the battery pack;
  (i) then determining the then-existing charge efficiency ($CE_t$);
  (ii) comparing $CE_t$ against the threshold value CE;

completing any charge cycle underway if $CE_t$ is below the threshold value CE, and then proceeding to a support mode without equalization;

if $CE_t$ is above the threshold value CE, continuing charging with periodic repetition of steps (i) and (ii) until full charging is completed or until $CE_t$ falls below the threshold value CE, in which event any charge cycle underway is completed and the support mode is entered.

2. The battery charging method of claim 1 wherein the pack cooling system has a cooling medium, and $T_{hi}$ is measured at a point in the cooling system through which said cooling medium flows before heat transfer from the pack.

3. The battery charging system of claim 1 including the further step of establishing a state of charge threshold value below which charge efficiency is not considered to be a factor ($SOC_{CE}$), and comparing SOC against $SOC_{CE}$, and continuing any charge cycle regardless of whether $CE_t$ is below CE if SOC is below $SOC_{CE}$.

4. The battery charging system of claim 3 wherein CE is about 75% and $SOC_{CE}$ is about 80%.

5. In a rechargeable electrochemical battery system having a series arrangement of multiple batteries in a pack, and a pack cooling system having a cooling mode, a method of optimizing the charging of the battery pack, comprising the steps of:

establishing pre-selected charge efficiency values as a function of battery pack temperature and state of charge (SOC), including a threshold value CE below which charging is considered to be not optimal;

establishing a pre-selected pack temperature criterion ($T_{hi}$) above which pack cooling by the pack cooling system is considered reduced in effectiveness;

establishing a threshold $SOC_{CE}$ below which CE is not considered as a charge completion criterion;

measuring overall pack temperature;

performing a full charging event if the measured pack temperature is below $T_{hi}$ or if the thermal system is not in a cooling mode;

if the pack temperature is above $T_{hi}$, measuring SOC of the battery pack;
  (i) then determining the then-existing charge efficiency ($CE_t$);
  (ii) comparing SOC against $SOC_{CE}$;
  (iii) comparing $CE_t$ against the threshold value CE;

completing any charge cycle underway if $CE_t$ is below the threshold value CE, and SOC is greater than $SOC_{CE}$, and then proceeding to a support mode without equalization;

if $CE_t$ is above the threshold value CE or SOC is less than $SOC_{CE}$, continuing charging with periodic repetition of steps (i), (ii) and (iii) until full charging is completed or until $CE_t$ falls below the threshold value CE and SOC is greater than $SOC_{CE}$, in which event any charge cycle underway is completed and the support mode is entered.

6. An apparatus for improved battery charging in a rechargeable electrochemical battery system having a series arrangement of multiple batteries in a pack, and a pack cooling system having a cooling mode, comprising:

a battery pack controller having comparator circuitry, said controller being programmed with pre-selected charge efficiency data values as a function of battery pack temperature and state of charge (SOC), including a threshold value CE below which charging is considered to be not optimal, and being programmed with a pre-selected cooling medium temperature criterion ($T_{hi}$) above which cooling by the pack cooling system is considered reduced in effectiveness;

a temperature sensor communicating with a pack temperature sensing point, said temperature sensor generating a temperature signal;

a current sensor communicating with the battery pack and measuring a current which is used to calculate state of charge, said current sensor generating a current signal;

signal circuitry communicating said temperature signal and said current signal to said controller;

charge circuitry connecting a source of current to each said battery; and said controller having a charging program for optimum charging which measures overall pack temperature and cooling medium temperature, and performs a full charging event if the measured cooling medium temperature is below $T_{hi}$ or if the thermal system is not in a cooling mode, and if the cooling medium temperature is above $T_{hi}$, measuring SOC of the battery pack,
  (i) then determining the then-existing charge efficiency ($CE_t$),
  (ii) comparing $CE_t$ against the threshold value CE, and completing any charge cycle underway if $CE_t$ is below the threshold value CE, thereafter proceeding to a support mode without equalization, and if $CE_t$ is above the threshold value CE, continuing charging including equalization with periodic repetition of steps (i) and (ii) until full charging is completed or until $CE_t$ falls below the threshold value CE, in which event any charge cycle underway is completed and the support mode is entered.

7. The battery charging apparatus of claim 6 including establishing in the controller a state of charge threshold value below which charge efficiency is not considered to be a factor ($SOC_{CE}$), with said controller comparing SOC against $SOC_{CE}$, and continuing any charge cycle regardless of whether $CE_t$ is below CE if SOC is below $SOC_{CE}$.

8. The battery charging apparatus claim 7 wherein CE is about 75% and $SOC_{CE}$ is about 80%.

9. An apparatus for improved battery charging in a rechargeable electrochemical battery system having a series arrangement of multiple batteries in a pack, and a pack cooling system having a cooling mode, comprising:

battery pack controller means having comparator circuitry, said controller means being programmed with pre-selected charge efficiency data values as a function of battery pack temperature and state of charge (SOC), including a threshold value CE below which charging is considered to be not optimal, and being programmed with a pre-selected cooling medium inlet temperature criterion ($T_{hi}$) above which pack cooling by the pack cooling system is considered reduced in effectiveness;

a temperature sensing means communicating with a pack temperature sensing point, said temperature sensing means generating a temperature signal;

a current sensing means communicating with the battery pack for calculation of SOC and generating a current signal;

signal circuitry means communicating said temperature signal and said current signal to said controller means;

charge circuitry means for connecting a source of current to each said battery; and said controller means having a charging program means for optimum charging which measures overall pack temperature and cooling medium temperature, and performs a full charging event if the measured cooling medium temperature is below $T_{hi}$ or if the thermal system is not in a cooling mode, and if the cooling medium temperature is above $T_{hi}$, measuring SOC of the battery pack, (i) then determining the then-existing charge efficiency ($CE_t$), (ii) comparing $CE_t$ against the threshold value CE, and completing any charge cycle underway if $CE_t$ is below the threshold value CE, thereafter proceeding to a support mode without equalization, and if $CE_t$ is above the threshold value CE, continuing any charge cycle including equalization with periodic repetition of steps (i) and (ii) until full charging is completed or until $CE_t$ falls below the threshold value CE, in which event charging is terminated and the support mode is entered.

10. The battery charging apparatus of claim 9 including establishing in the controller a state of charge threshold value below which charge efficiency is not considered to be a factor ($SOC_{CE}$), with said controller comparing SOC against $SOC_{CE}$, and continuing any charge cycle regardless of whether $CE_t$ is below CE if SOC is below $SOC_{CE}$.

11. The battery charging apparatus of claim 10 wherein CE is about 75% and $SOC_{CE}$ is about 80%.

* * * * *